United States Patent
van der Ham et al.

(10) Patent No.: US 10,570,956 B2
(45) Date of Patent: Feb. 25, 2020

(54) SENSORIZED ROLLER

(71) Applicant: Aktiebolaget SKF, Gothenburg (SE)

(72) Inventors: Andreas Clemens van der Ham, Utrecht (NL); Gerrit-Jan Dop, Alphen aan den Rijn (NL); Ben Koperdraad, IJsselstein (NL); Nicolas Laurent, Meyzieu (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/218,674

(22) Filed: Dec. 13, 2018

(65) Prior Publication Data

US 2019/0203764 A1  Jul. 4, 2019

(30) Foreign Application Priority Data

Jan. 3, 2018  (DE) .................. 10 2018 200 047

(51) Int. Cl.
*F16C 19/52*  (2006.01)
*F16C 41/00*  (2006.01)
(Continued)

(52) U.S. Cl.
CPC .......... *F16C 19/522* (2013.01); *F16C 33/366* (2013.01); *F16C 41/00* (2013.01);
(Continued)

(58) Field of Classification Search
CPC ........ F16C 19/522; F16C 33/66; F16C 41/00; F16C 2202/44; F16C 33/366; G01L 5/101; G01L 5/0019; G01L 5/16; G01L 5/0009
(Continued)

(56) References Cited

U.S. PATENT DOCUMENTS 6,161,962 A * 12/2000 French ................... B61F 15/20
                                                    384/448
7,698,963 B2 * 4/2010 Herhaus ................ G01L 1/2243
                                                    73/862.633
(Continued)

FOREIGN PATENT DOCUMENTS

DE  102010005476 A1  7/2011
DE  102011006907 A1  10/2012
(Continued)

*Primary Examiner* — Marcus Charles
(74) *Attorney, Agent, or Firm* — Garcia-Zamor Intellectual Property Law, LLC; Ruy Garcia-Zamor; Bryan Peckjian

(57) ABSTRACT

A sensorized roller of a bearing, the roller having a central bore extending axially therethrough and a sensor module mounted within the bore in a non-fixed manner. The module includes at least four deformation sensors arranged circumferentially around a module center axis, at defined angular intervals. Each deformation sensor measures a radial distance (measured for defined angular positions lying within an angular span of 180°) between the center axis and a radially inner bore surface. The module includes a processor which receives each measured radial distance and calculates a radial load (under static or dynamic conditions) acting on the roller by estimating an offset angle of the fixed reference relative to the radial load direction and by using the estimated offset angle and each measured radial distance as inputs to a mathematical model, describing a deformation radius of the bore as a function of angular position and load dependent parameters.

13 Claims, 3 Drawing Sheets

(51) Int. Cl.
*F16C 33/36* (2006.01)
*G01L 5/00* (2006.01)
*G01L 5/10* (2006.01)
*G01L 5/101* (2020.01)

(52) U.S. Cl.
CPC .......... *G01L 5/0004* (2013.01); *G01L 5/0009* (2013.01); *G01L 5/0019* (2013.01); *G01L 5/101* (2013.01)

(58) Field of Classification Search
USPC ............. 384/448; 198/608, 789; 73/862.381, 73/862.621, 862.451, 862.625, 862.627
See application file for complete search history.

(56) References Cited

U.S. PATENT DOCUMENTS

| | | | | |
|---|---|---|---|---|
| 8,079,275 | B2* | 12/2011 | Grab | G01L 3/102 73/862.335 |
| 8,672,553 | B2 | 3/2014 | Matsuda et al. | |
| 9,352,911 | B2* | 5/2016 | Hearn | G01G 11/003 |
| 2008/0115590 | A1* | 5/2008 | Loenner | G01L 5/0019 73/862.42 |
| 2011/0155539 | A1* | 6/2011 | Schmidt | B65G 23/08 198/608 |
| 2012/0020603 | A1 | 1/2012 | Stubenrauch et al. | |
| 2015/0219163 | A1* | 8/2015 | Drescher | F16C 41/007 384/446 |
| 2018/0003227 | A1 | 1/2018 | Gerrit-Jan et al. | |

FOREIGN PATENT DOCUMENTS

| | | |
|---|---|---|
| DE | 102012200773 A1 | 7/2013 |
| DE | 102012200778 A1 | 7/2013 |
| DE | 102012200779 A1 | 7/2013 |
| DE | 102012200780 A1 | 7/2013 |
| DE | 102012200781 A1 | 7/2013 |
| EP | 2354578 A2 | 8/2011 |
| WO | 2013107887 A1 | 7/2013 |
| WO | 2015032449 A1 | 3/2015 |
| WO | 2016016054 A1 | 2/2016 |

* cited by examiner

SENSORIZED ROLLER

CROSS-REFERENCE TO RELATED APPLICATION

This application claims priority to German patent application no. 102018200047.6 filed on Jan. 3, 2018, the contents of which are fully incorporated herein by reference.

TECHNICAL FIELD OF THE INVENTION

The present invention relates to the field of load detection in roller bearings and is more particularly directed to a bearing roller with a hollow bore in which sensors are provided for measuring deformation of the roller bore.

BACKGROUND OF THE PRESENT INVENTION

An example of a bearing roller of this kind is known from WO 2016/016054. A device for detecting a radial load acting on the roller is disclosed. The device comprises a load cell that spans the roller bore diameter and is in fixed contact with diametrically opposite portions of the bore surface. When the roller is radially loaded, the circular cross section of the hollow bore is deformed to an elliptical shape. Under load, the load plane remains the same, but the contact locations of the load cell rotate within this plane during rotation of the roller. As a result, the contact locations not only experience radial displacement relative to each other, but also a transverse displacement. This effect is sometimes referred to as a chewing effect. The load cell comprises a bending beam and a hinge arrangement and is designed such that the contact locations move with the bore surfaces, via elastic deformation of the load cell, to take up the motion associated with the chewing effect.

The disclosed device is configured to calculate the radial load on the bearing roller under rotational conditions.

There is still room for improvement in terms of a defining a roller with integrated load sensing device that can also determine the radial load on the roller under static conditions.

BRIEF SUMMARY OF THE PRESENT INVENTION

The present invention resides in a sensorized roller of a roller bearing, which has a central bore that extends in an axial direction through the roller and a sensor module that is mounted within the bore in a non-fixed manner. The sensor module is configured for determining a radial load on the bearing roller under static conditions i.e. when the bearing is stationary. The sensor module comprises at least four deformation sensors arranged circumferentially around a center axis of the sensor module, at defined angular intervals βk relative to a fixed reference, whereby each deformation sensor is configured to measure a radial distance r1, r2, r3, r4 between the center axis and a radially inner surface of the bore at the corresponding angular position. The at least four radial distances r1, r2, r3, r4 are measured for defined angular positions which lie within an angular span of 180 degrees. The sensor module is further equipped with a processor, which is configured to receive each of the measured radial distances and to calculate the radial load acting on the roller by estimating an offset angle φ of the fixed reference relative to the radial load direction; and by using the estimated offset angle and each measured radial distance as inputs to a mathematical model which describes a deformation radius of the bore as a function of angular position and parameters dependent on the load.

When the roller and integrated sensor module are stationary, the fixed reference can be located at any angle (offset angle) relative to the radial load line. The processor in the sensorized roller of the invention is configured to estimate this offset angle from the at least four measured radial distances, which correspond to four deformed bore radii. Suitably, the mathematical model of the bore deformation is derived from a finite element analysis of the roller under different radial loading. In a preferred embodiment, the mathematical model is based on a Fourier series expansion of a bore deformation signal obtained from the finite element analysis. In a particularly preferred embodiment, the Fourier series expansion has two harmonics, as this has been found to combine excellent accuracy with fast computational speed.

In one example, the sensor module comprises four deformation sensors arranged at even angular intervals of 45 degrees. The processor is then configured to estimate the offset angle φ using the following relationship:

$$\varphi = \frac{1}{2} \times a\tan 2\left(\frac{r_3 - r_1}{r_4 - r_2}\right)$$

In an embodiment, each of the at least four deformation sensors is a proximity sensor with a sensing element arranged at a radially outer surface of the sensor module, so has to face the bore surface with a small radial gap. The proximity sensor can be an optical sensor, such as a Fabry-Perot fibre sensor, a capacitive sensor or an inductive sensor. Preferably, inductive sensors are used, since these sensors are largely insensitive to the presence of an interposing contaminant such as grease. Needless to say, such proximity sensors which measure the bore deformation in a contact free manner are not affected by the problems associated with the chewing motion discussed earlier.

In an alternative example, the at least four deformation sensors are in contact with the radially inner surface of the bore, in a non-fixed manner. Each deformation sensor may comprise a cantilever beam that is attached to a main body of the sensor module or which extends therefrom as an integral part. Each beam has a contact element at its free end which bears against the bore surface. The beam is further instrumented with at least one strain gauge for measuring beam deflection. Preferably, the cantilever beam is provided with a strain gauge on its radially inner surface and on its radially outer surface.

To ensure that the contact elements remain in contact with the bore surface, even when the deformed bore diameter is at a maximum value, the sensor module is advantageously provided with means to enable the cantilever beams to be pre-tensioned within the bore. In one example, the main body of the sensor module comprises an annular notch arranged next to a first region of the main body from where each cantilever beam extends, whereby the notch is configured to act as a hinge. The main body further comprises an axial recess in an end face thereof, and The sensor module is equipped with a conical element that engages in the axial recess and which is displaceable into the axial recess, so as to cause displacement of the second region of the main body in a radially outward direction.

Because the contact element of each cantilever beam is movable relative to the bore surface, a sensor module comprising such deformation sensors is also insensitive to the chewing motion discussed earlier. A small amount of sliding contact may occur. Advantageously, the contact elements are executed with a dome-shaped geometry, to reduce the contact pressures.

In an embodiment, each of the at least four deformation sensors is paired with a further deformation sensor that is located at a diametrically opposite angular position, so as to form a first sensor pair, a second sensor pair, a third sensor pair and a fourth sensor pair. This embodiment is advantageous when the center axis of the sensor module is radially offset from the roller axis, as it enables the radial offset to be cancelled out.

The at least four de deformation sensors are arranged in generally the same axial region of the roller, preferably in an axially central region. In a further embodiment, the sensor module is equipped with a first set of at least four deformation sensors arranged in an axially central region of the roller, and at least one further set of at least four sensors that are arranged at an axially outer region of the roller. This enables a load distribution along the roller to be determined, to enable the detection of e.g. a misalignment of the bearing rings.

It is also possible for the sensor module to comprise only four deformation sensors. When the deformation sensors are proximity sensors, the sensors may be arranged within the angular span of 180 degrees, i.e. within the same half circle. When the sensor module comprises deformation sensors in the form of cantilever beams, it is advantageous to arrange two of the beams on opposite half circles, so that they support and balance each other. The beams may not be arranged diametrically opposite from each other, such that they measure a radius of the same diameter. Each sensor must be arranged to measure a bore radius that is associated with a separate diameter, whereby it is assumed that the bore radius at the measured angular position is equal to the bore radius at the diametrically opposite side. In effect, the four measured radial distances lie in the same half circle. In an example of this kind, the sensor module has a first deformation sensor arranged at zero degrees relative to the fixed reference, a second deformation sensor arranged at 45 degrees, a third sensor arranged at 135 degrees and a fourth sensor arranged at 270 degrees.

Suitably, the sensor module is mounted to the roller bore by first and second axially spaced resilient elements, such as O-rings, which are able to take up the radial deformations of the bore.

Advantageously, the sensor module comprises a cylindrical housing made of a rigid material that is shaped to fit inside the roller bore with a small radial clearance and to be fully contained within the dimensions of the roller. The housing protects the processor and sensor electronics from contamination and enables the sensor module to be mounted as a self-contained unit within the roller bore. The housing preferably also accommodates an energy source such as a battery and an antenna for wireless transmission of the determined radial load to a receiver located outside of the bearing. When the sensor module comprises deformation sensors in the form of cantilever beams, the housing may comprise apertures through which the contact elements protrude.

The sensor module in a roller according to the invention can thus be mounted as a self-contained unit and enables the radial load on the roller to be determined under static conditions. The described processing method can also be used to calculate the load under quasi-static conditions, and even under dynamic conditions, although in the case of dynamic loading it is computationally faster to calculate the load from the dynamic signal in a conventional manner. However, the invention will allow for a far greater spatial resolution of the loaded zone of the bearing. This can be advantageous when the transient behavior in the bearing load is changing faster than it takes for a roller revolution.

The invention will now be described in further detail with reference to the accompanying drawings.

DETAILED DESCRIPTION OF THE PRESENT INVENTION

Figure 1:
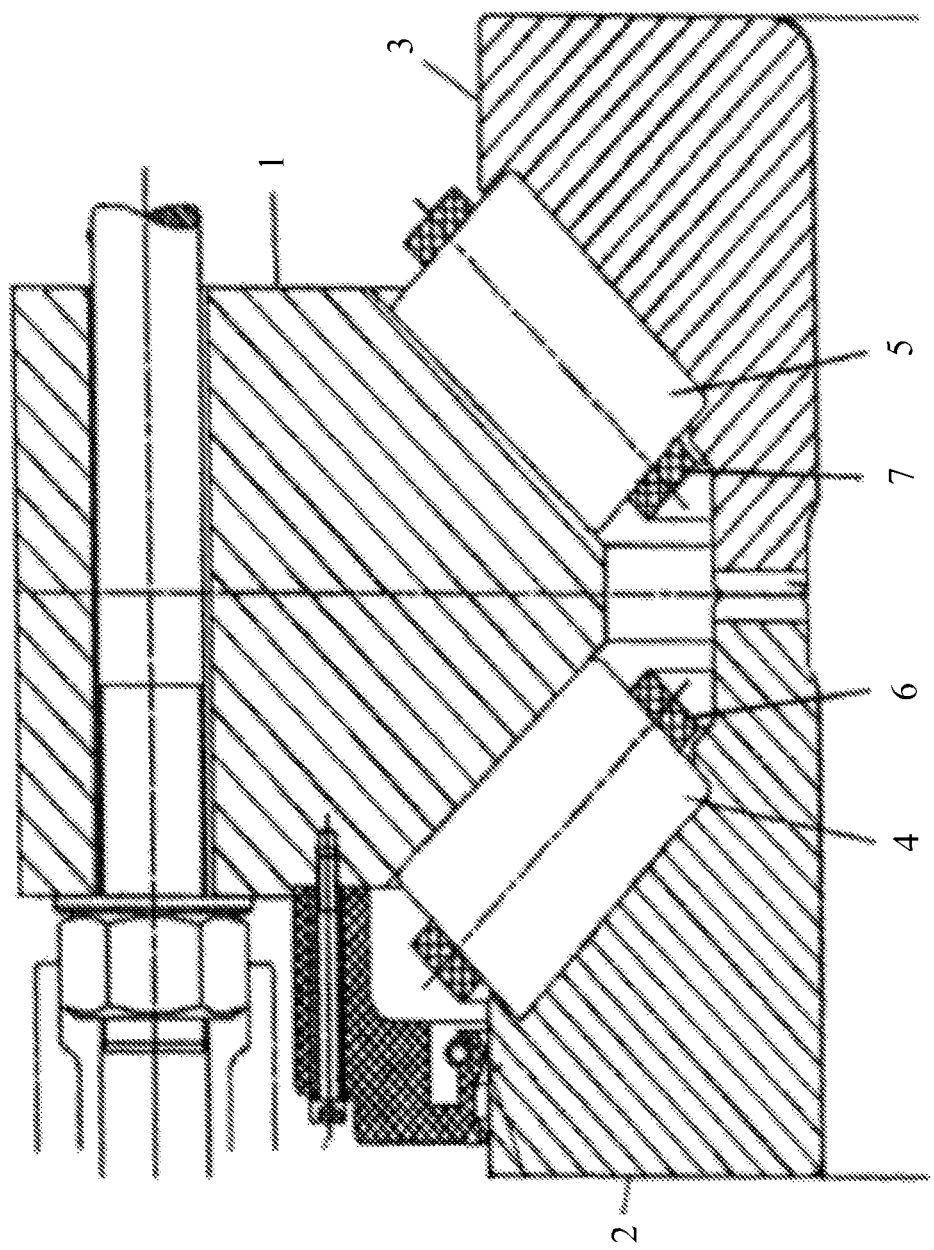
FIG. 1 shows a part cross-sectional view of a roller bearing that may be equipped with a roller according to the invention.

An example of a bearing that is suitable for supporting the main shaft of a wind turbine is shown in FIG. 1. The bearing must withstand high axial loads as well as radial loads and is executed as a double-row tapered roller bearing. The bearing comprises an outer ring 1 provided with conically shaped first and second outer raceways for a first set 4 and a second set 5 of tapered rollers. The bearing further comprises first and second inner rings 2, 3 which are respectively provided with conically shaped first and second inner raceways for the first and second roller sets 4, 5. In addition, a first cage 6 and a second cage 7 are provided for retaining the rollers of the first and second roller sets respectively. Typically, the cages are formed from segments interleaved with rollers without segments that abut each other in circumferential direction.

To provide the necessary stiffness and ensure a long service life, the bearing is preloaded. The axial position of the inner rings 2, 3 relative to the outer ring 1 is set such that the first and second roller sets 4, 5 have a negative internal clearance. The first and second inner rings are then bolted together or otherwise axially clamped to maintain the preload over the lifetime of the bearing. In practice, however, preload gradually decreases over time. If preload is lost and the radial load on a roller becomes zero, it will be able to move towards a small-diameter side of the radial gap between the inner and outer raceways, possibly leading to an excessive load that will reduce the service life of the bearing. Since a main shaft bearing is a critical and expensive component of a wind turbine, it is important to detect if the bearing loses preload.

It is also beneficial to be able to measure the radial load acting on the bearing, to detect an overload condition, and to characterize the angular extent of the bearing's loaded zone. In applications such as wind turbines, it is also advantageous to measure radial load when the bearing is stationary. In stormy conditions, for example, when the turbine blades are in a "parked" position, the bearing might experience an overload that could adversely affect bearing life. To enable determination of the radial load acting on the bearing under static conditions, the depicted bearing is equipped with a sensorized roller according to the invention.

Figure 2:
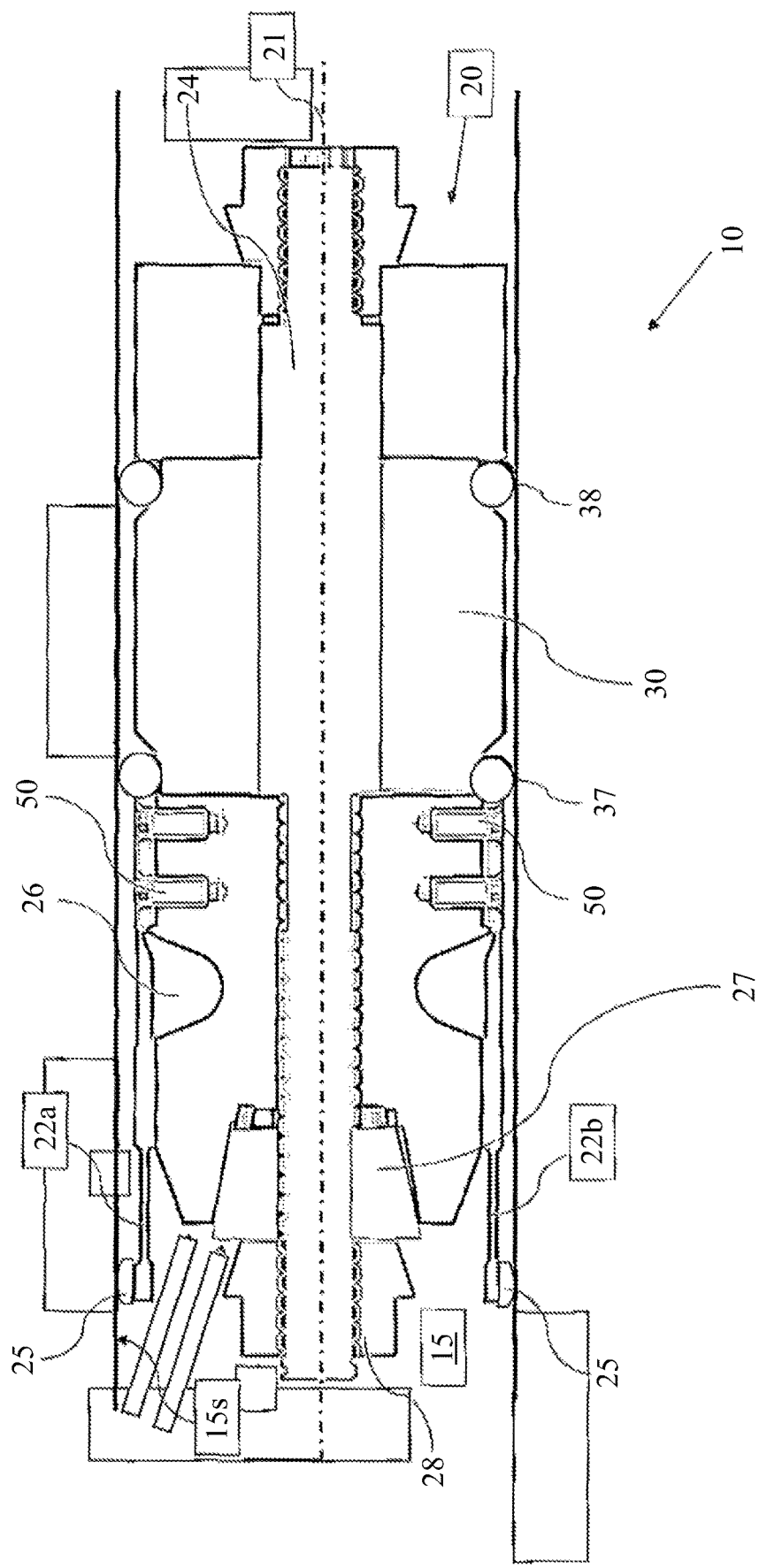
FIG. 2 shows a cross-section of an example of a sensorized roller according to the invention comprising a sensor module mounted in a hollow bore of the roller.

A radial cross-section of an example of a sensorized roller according to the invention is shown schematically in FIG. 2. The roller 10 has a roller body whose radially outer surface (not shown) is in contact with the inner and outer raceways of the bearing. The roller is provided with a central, cylindrical bore 15, which has a cylindrical bore surface 15s. A sensor module 20 is arranged within the bore for determining the radial load on the roller under static conditions, using a number of circumferentially arranged deformation sensors. The module further comprises a processor, which receives a signal from each deformation sensor and calculates the static radial load on the roller 10.

In unloaded condition, the roller bore 15 has a circular cross-section. Under radial loading, the circular bore deforms to an essentially elliptical shape. When viewed in axial direction and assuming that a line of radial load passes though the bore at an angular position of 0 degrees and 180 degrees, the bore radius at these positions will be compressed to a minimum value. At angular positions of 90 degrees and 270 degrees, the bore radius will expand to a maximum value. When measuring radial load under dynamic conditions, where the sensorized roller rotates together with the roller about a roller axis, a bore deformation sensor will detect a corresponding deformation signal comprising maximum and minimum peaks in a cyclical fashion. The dynamic radial load acting on the roller can be derived from the measured maximum and minimum peaks in the signal. As will be understood, it is not possible measure static load in this way.

A sensor module according to the invention is equipped with at least four deformation sensors arranged circumferentially around an axis 21 of the sensor module 20, each of which detects changes in the radial distance between the bore surface 15s and the sensor module axis. Assuming that the axis 21 of the sensor module 20 is fully aligned with the axis of the roller bore, each deformation sensor measures the bore radius at 4 angularly spaced locations.

Suitably, a parametric model characterizing the behavior of the bore under load is developed using finite element analysis (FEA). The parametric model should express the radial distance from the center axis as a function of phase angle around the bore and parameters which are dependent on the load. As mentioned, the deformation of the circular bore cross-section is generally elliptical, which can be described by the following equation:

$$r(\theta) = \frac{a \times b}{\sqrt{(b \times \cos\theta)^2 + (a \times \sin\theta)^2}} \qquad \text{Equation (1)}$$

Where:
$r(\theta)$ is the radius of the ellipse at a phase angle $\theta$,
a is semi-major axis of the ellipse and
b is the semi-minor axis of the ellipse.

A fitting model based on purely elliptical deformation is possible, but may not be sufficiently accurate in practice. The deformed shape of the bore is not exactly an ellipse and deformation can be the result of thermal expansion as well as radial load.

The deformation "signal" obtained for $r(\theta)$ from the results of the FEA analysis is generally sinusoidal in shape. A high order polynomial may be used to describe the function $r(\theta)$. Preferably, a Fourier series expansion with two harmonics is used as the mathematical fitting model, as the inventors have found that this delivers an optimal balance between accuracy and computational efficiency.

The following expression can be derived from a FFT transform of the bore deformation signal:

$$r(\theta) = a_0 + a_1 \times \cos(2\theta) + a_2 \times \cos(4\theta) + a_3 \times \cos(10\theta) \qquad \text{Equation (2)}$$

Where a0 is a general offset of the deformation level that is dependent on load and thermal expansion;
a1, a2, a3 are coefficients proportional to the applied load.

An algorithm is then used to match the measured radii to the model. In a load-sensing application, a deformation sensor k measures a radius rk at a known relative angle βk from a fixed reference. However, an offset angle φ of the fixed reference relative to the actual direction of the radial load is unknown. The sensor module within the roller bore rotates and may thus adopt any angular orientation when stationary.

Defining the phase angle of the sensor k as θk=βk+φ, equation 2 can be rewritten as:

$$r_k = a_0 + a_1 \times \cos(2\theta_k) + a_2 \times \cos(4\theta_k) = a_0 + a_1 \times \cos(2\times(\beta_k+\varphi)) + a_2 \times \cos(4\times(\beta_k\varphi)) \qquad \text{Equation (3)}$$

There are 2 cosine waves to be identified, which have respective periods of π and π/2. This makes it necessary to obtain 4 measurements r1, r2, r3, r4 within half a circle, in order to solve the equation. It is assumed that deformation is symmetrical and that bore radius at a particular phase angle is equal to the bore radius at the diametrically opposite side.

In the embodiment shown in FIG. 2, the sensor module 20 comprises eight deformation sensors in the form of cantilever beams which bend in response to bore deformation. The eight beams are circumferentially arranged around the sensor module axis 21 with an even angular spacing and are connected in diametrically opposite pairs. Only a first pair of deformation sensors 22a, 22b is visible in the depicted cross-section. If the sensor module axis 21 is coaxial with the bore axis, then each bending beam 22a, 22b will measure the same radial distance from the center axis 21. In cases where there is a small eccentricity in radial direction, one sensor in the pair will measure a positive radial error and the other sensor in the pair will measure a negative radial error, enabling the radial error to be cancelled out. In effect, a bore radius r1, r2, r3, r4 is measured at four angular positions within half a circle, at 45 degree intervals.

Equation 3 may be solved using a search function which makes initial guesses about the value of the deformation level offset a0 and the offset angle φ and finds the best fit with the measured radii. Preferably, to minimize the computational time needed, the processor is configured to calculate the offset angle from the measured radii r1, r2, r3, r4 using an algebraic equation. In the given example of four bore radii measured at 45 degree intervals, the expression for the measurement of rk from Equation 3 may be developed as follows:

$$r_l = a_c + a_1 \times \cos(2\times(\beta_k+\varphi)) + a_2 \times \cos(4\times(\beta_k+\varphi)) \qquad \text{Equation (4)}$$

$$r_k = a_c + a_1 \times \cos\left(2\times\left(k\frac{\pi}{4}+\varphi\right)\right) + a_2\cos\left(4\times\left(k\frac{\pi}{4}+\varphi\right)\right)$$

$$r_k = a_c + a_1 \times \left[\cos\left(k\frac{\pi}{2}\right)\cos(2\varphi) - \sin\left(k\frac{\pi}{2}\right)\sin(2\varphi)\right] + a_2 \times [\cos(k\pi)\cos(4\varphi) - \sin(k\pi)\sin(4\varphi)]$$

$$r_k = a_c + a_1 \times \left[\cos\left(k\frac{\pi}{2}\right)\cos(2\varphi) - \sin\left(k\frac{\pi}{2}\right)\sin(2\varphi)\right] + a_2 \times [\cos(k\pi)\cos(4\varphi)]$$

which leads to $$r_1 = r(\beta_k = 45°) = a_0 - a_1 \times \sin(2\varphi) - a_2 \times \cos(4\varphi)$$

$$r_2 = r(\beta_k = 90°) = a_0 - a_1 \times \cos(2\varphi) + a_2 \times \cos(4\varphi)$$

$$r_3 = r(\beta_k = 135°) = a_0 + a_1 \times \sin(2\varphi) - a_2 \times \cos(4\varphi)$$

$$r_4 = r(\beta_k = 180°) = a_0 + a_1 \times \cos(2\varphi) + a_2 \times \cos(4\varphi) \quad \text{Equation (5)}$$

Consequently $$r_3 - r_1 = 2a_1 \sin(2\varphi)$$

$$r_4 - r_2 = 2a_1 \cos(2\varphi) \quad \text{Equation (6)}$$

The offset angle may be calculated as follows:

$$\varphi = \frac{1}{2} \times a\tan2\left(\frac{r_3 - r_1}{r_4 - r_2}\right) \quad \text{Equation (7)}$$

Once the offset angle has been calculated, the processor is then suitably configured to fit the measured radii r1, r2, r3, r4 to the parametric model using, e.g. a least squares fitting method or a 2nd order polynomial fit to solve the coefficients a0, a1, a2 from the Fourier series (Equation (3)) and calculate the radial load on the roller.

As mentioned, the deformation sensors in the embodiment of FIG. 2 are executed as cantilever beams. The sensor module 20 has a main body 23 through which a central bolt 24 extends. The module is mounted to the bore 15 via first and second axially spaced resilient elements 37, 38. In the depicted example, O-rings made of a compliant material such as NBR are used to radially locate the main body 23 within the bore 15 and take up bore deformation, so that the main body 23 of the module does not make contact with the bore surface 15s. The module further comprises an enclosed annular region 30, where the processor and preferably also an antenna is housed.

Eight cantilever beams are attached via e.g. screws 50 at a mounting location on the main body 23. Only two of the beams 22a, 22b are visible in the depicted cross-section. Each beam has a free end that extends from a beam support location on the main body 23. At the extremity of each free end, a contact element 25 is provided which is arranged to bear against the bore surface 15s, meaning that bore deformation and corresponding changes in the bore radius causes deflection of each cantilever beam 22a, 22b. Between the contact element 25 and a supported portion of each beam, at least one strain gauge is provided for measuring beam bending. Preferably, both the radially inner side and radially outer side of each beam are provided with a strain gauge. As mentioned above, the beams 22a, 22b shown in FIG. 2 operate as a first sensor pair, for eliminating radial eccentricity errors. The first sensor pair thus has four strain gauges, which are advantageously connected in a Wheatstone bridge to compensate for temperature sensitivity.

Due to the generally elliptical deformation shape of the bore, the radial distance between the center axis 21 and the bore surface 15s varies between a maximum value and a minimum value, depending on the angular orientation of the roller relative to the radial load line. To ensure that the contact elements 25 of each beam 22a, 22b remain in contact with the bore surface 15s when the beams are in a position of maximum radial distance, the beams should be mounted with a certain pre-tension within the bore. The sensor module is designed to enable this, after the sensor module 20 has been inserted into the bore.

The main body 23 comprises an annular notch 26 to create an area of smaller diameter that can function as a hinge. The notch 26 is provided between the attachment location of each beam and the support location from where the free end of each beam extends. Furthermore, the main body 23 has an axial recess, provided in an end face of the body, in the region of the beam support locations. The sensor module further comprises a conical element 27, which is mounted on the central bolt 24 and which engages in the axial recess of the main body. Once mounted to the roller bore, a nut element 28 is tightened on the central bolt 24, to push the conical element 27 further into the axial recess. This causes displacement of the beam support location in a radially outward direction, and displaces the contact elements 25 towards the bore surface 15s. The conical element 27 is displaced into the axial recess until the strain readings from the strain gages on each beam indicate that the beams are sufficiently pre-tensioned.

The sensor module is mounted within the bore 15 in a non-fixed manner. During bearing operation, it is therefore possible for relative rotation in circumferential direction to occur. Such a motion is referred to as creep, and is expected to be significantly slower than the rotational speed of the roller 10, due to the friction between the first and second resilient elements 37, 38 and the surfaces which they contact. The bending of the beams during bearing operation also leads to a very slight axial displacement of the contact elements 25 relative to the bore surface 15s. Some degree of sliding contact will therefore take place. The contact elements 25 are therefore executed with a dome-shaped geometry, resembling a slice through a peripheral region of a sphere. Suitably, the diameter of the dome in circumferential direction is selected to conform to the cylindrical surface 15s of the bore. This leads to relatively low Herzian contact pressures and minimizes wear.

Figure 3:
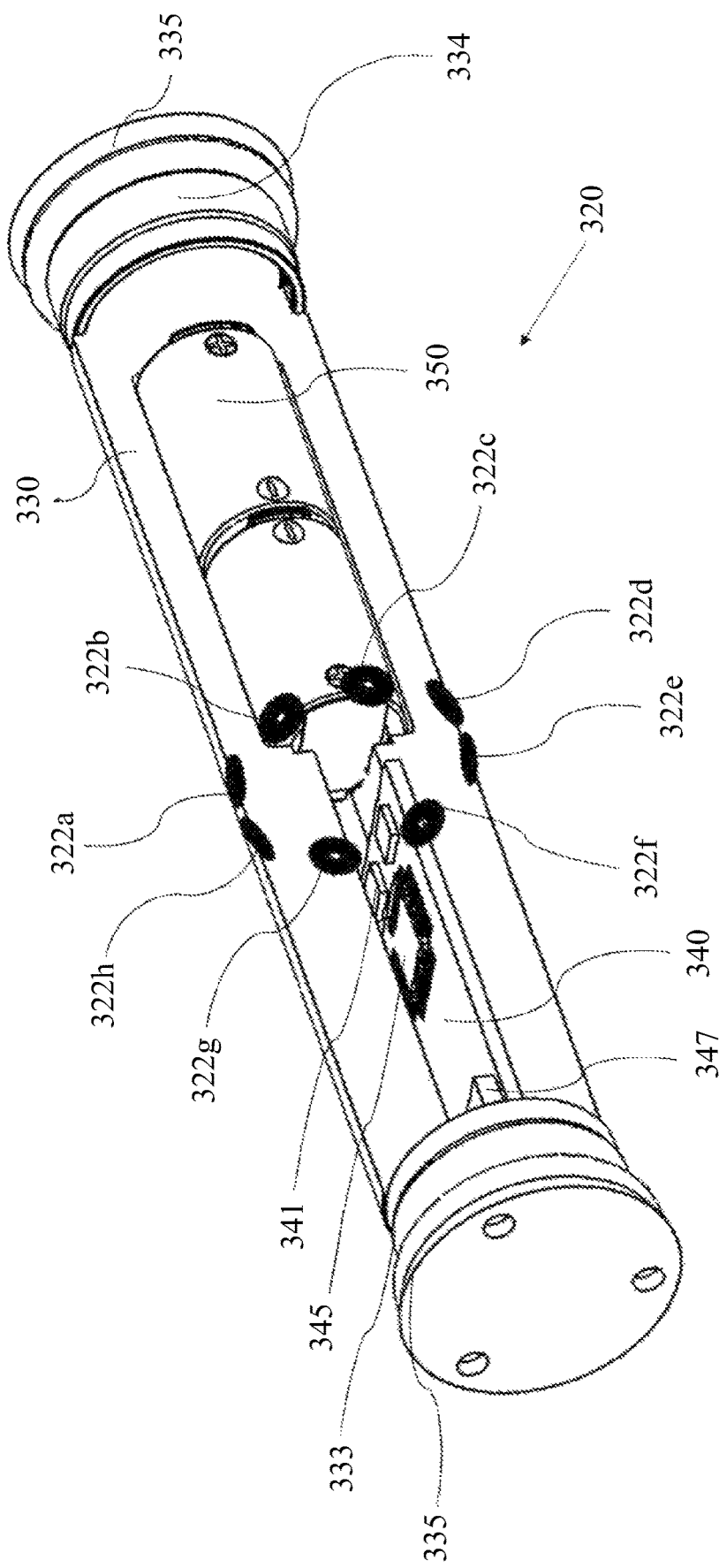
FIG. 3 shows a perspective view of a further example of a sensor module, with part of a housing component removed.

In a further embodiment of a sensorized roller according to the invention, the sensor module is equipped with proximity sensors that measure changes in the bore radius in a contact-free manner. A perspective view of an example of such a sensor module is shown in FIG. 3, whereby some sections have been removed to reveal the underlying components.

The sensor module 320 comprises a housing 330 made of a rigid material that is shaped to fit within a cylindrical roller bore with a small radial clearance. The housing has a main cylindrical body which has a smaller diameter than the bore diameter and is dimensioned to be contained within the dimensions of the roller. The sensor module 320 is located in radial direction relative to the cylindrical bore by first and second resilient sealing elements which are arranged between a radially inner surface of the bore and a radially outer surface of the housing 330. O-rings are used in the depicted example. The housing is axially located within the roller bore by first and second end caps 333, 334 which have a main cylindrical part that fits over the main cylindrical body of the housing 330 at either axial end. Each end cap also has a flange part 335 with a larger diameter than the main cylindrical part which, after assembly, bears against a recessed area that is machined into each axial end face of the roller. The housing 330 of the sensor module can thus be accurately positioned with respect to the roller bore.

The sensor module 320 is further provided with eight circumferentially spaced inductive sensors 332a-332g which have a sensing element formed by a circular coil that is seated in the outer cylindrical surface of the housing 330 and faces the surface of the roller bore with a small radial gap of e.g. 1.0 mm. The coil of each inductive sensor is connected to a capacitor in a LC tank circuit which is driven at resonance so as to generate a high-frequency magnetic field in the coil. This induces eddy currents in the facing surface of the roller bore, which generate a secondary magnetic field that opposes the primary field of the coil, causing an apparent shift in the tank resonant frequency that is proportional to the radial gap between the coil and the bore surface. This shift is detected in order to measure changes in the radial gap, and thus changes in the bore radius due to deformation.

Like the embodiment of FIG. 2, the eight sensors act as four sensor pairs. Diametrically opposite sensors 322a and 332e form a first sensor pair and together measure a first bore radius r1; diametrically opposite sensors 322b and 332f form a second sensor pair and together measure a second bore radius r2; diametrically opposite sensors 322c and 332g form a third sensor pair and together measure a third bore radius r3; diametrically opposite sensors 322d and 332h form a fourth sensor pair and together measure a fourth bore radius r4. In accordance with the invention, the 4 radii are measured at circumferential locations within half a circle, i.e. within an angular span of 180 degrees.

The electronics associated with each inductive sensor 322a, 322b, 322c, 322d, 322e, 322f, 322g, 322h is suitably contained within a number of inductance digital converters (IDC) 341 mounted on a PCB 340. In the depicted example, the two circular coils associated with one sensor pair are connected to a single IDC, although the number of connected coils can be higher, depending on the number of input channels of the IDC.

The sensor module 320 also comprises a processor 345 that is configured to calculate the radial load on the roller from the measured radii r1, r2, r3, r4 as explained with reference to the FIG. 2 embodiment. An antenna 347 for transmitting the processed result to a receiver located outside of the bearing is also provided. The processor 345 and antenna 347 are also arranged on the PCB 340. The sensor module is further equipped with a battery 350 for powering the sensor and the processing electronics. It is also possible for the sensor module to be equipped for generating its own electrical power from the rotation of the roller.

The sensor module 320 as whole is thus a self-contained unit that is easy to mount and dismount from the roller bore.

A number of aspects and embodiments of the invention have been described. The invention is not restricted to these embodiments, but may be varied within the scope of the accompanying claims.

What is claimed is:

1. A sensorized roller for integration into a bearing, the sensorized roller comprising:
    a central bore that extends in axial direction through the roller; and
    a sensor module mounted within the bore in a non-fixed manner, the sensor module comprising:
        at least four deformation sensors arranged circumferentially around a center axis of the sensor module, at defined angular intervals βk relative to a fixed reference, whereby each deformation sensor is configured to measure a radial distance r1, r2, r3, r4 between the center axis and a radially inner surface of the bore at the corresponding angular position, whereby at least four radial distances r1, r2, r3, r4 are measured for defined angular positions which lie within an angular span of 360 degrees; and
        a processor which is configured to receive each of the measured radial distances and to calculate a radial load acting on the roller by estimating an offset angle φ of the fixed reference relative to the radial load direction, and by using the estimated offset angle φ and each measured radial distance r1, r2, r3, r4 as inputs to a mathematical model that describes a deformation radius of the bore as a function of angular position and parameters dependent on the load.

2. The sensorized roller according to claim 1, wherein the mathematical model used by the processor to calculate the radial load is based on a Fourier series expansion of a bore deformation signal obtained from finite element analysis of the roller under radial loading.

3. The sensorized roller according to claim 1, wherein the at least four deformation sensors comprises four deformation sensors which measure a radial distance at even angular intervals of 45 degrees,
    wherein the processor is configured to estimate the offset angle φ using the following relationship:

$$\varphi = \frac{1}{2} \times a\tan2\left(\frac{r_3 - r_1}{r_4 - r_2}\right).$$

4. The sensorized roller according to claim 1, wherein each of the at least four deformation sensors is a proximity sensor with a sensing element arranged at a radially outer surface of the sensor module so as to face the bore surface with a small radial gap.

5. The sensorized roller according to claim 1, each of the at least four deformation sensors further comprising a cantilever beam attached to a main body of the sensor module,
    the cantilever beam further comprising a contact element at its free end,
    wherein the free end bears against the bore surface,
    wherein the cantilever beam is instrumented with at least one strain gauge for measuring beam deflection.

6. The sensorized roller according to claim 5, the main body further comprising an annular notch arranged next to a first region of the main body from where each cantilever beam extends, wherein the notch is configured to act as a hinge;
    the main body further comprises an axial recess in an end face thereof; and
    the sensor module further comprises a conical element, wherein the conical element is configured to engage in the axial recess and is displaceable into the axial recess, so as to cause displacement of the second region of the main body in a radially outward direction, to enable each beam to be arranged in the bore under pre-tension.

7. The sensorized roller according to claim 5, wherein the contact element at the end of each cantilever beam has a dome-shaped geometry.

8. The sensorized roller according to claim 1, wherein each of the at least four deformation sensors is paired with a further deformation sensor that is located at a diametrically opposite angular position, so as to form a first sensor pair, a second sensor pair, a third sensor pair and a fourth sensor pair.

9. The sensorized roller according to claim 1, wherein the sensor module is mounted to the roller bore by first and second axially spaced resilient elements.

10. The sensorized roller according to claim 1, the sensor module further comprising a cylindrical housing made of a rigid material that is shaped to fit inside the roller bore with a small radial clearance and to be fully contained within the dimensions of the roller.

11. The sensorized roller according to claim 1, the sensor module further comprising an antenna for transmitting the radial load calculated by the processor to a receiver located outside of the bearing.

12. The sensorized roller according to claim 1,
the at least four deformation sensors further comprising a first set of at least four deformation sensors and at least one second set of at least four deformation sensors,
wherein the first set of at least four deformation sensors is arranged circumferentially around the sensor module axis in a first axial region of the roller,
wherein the at least one second set of the at least four deformation sensors is arranged circumferentially around the sensor module axis in a second axial region of the roller, axially spaced from the first region,
wherein the processor is configured to calculate the radial load acting on the roller in the first and second axial regions.

13. The sensorized roller according to claim 1, wherein the sensorized roller is integrated into the bearing.

* * * * *